United States Patent [19]
Ball et al.

[11] Patent Number: 4,594,755
[45] Date of Patent: Jun. 17, 1986

[54] CABLE BRANCH-OFF SEALING MEMBER

[75] Inventors: James H. Ball, St. Paul; Mark D. Sorlien, White Bear Lake, both of Minn.

[73] Assignee: Minnesota Mining and Manufacturing Company, St. Paul, Minn.

[21] Appl. No.: 713,349

[22] Filed: Mar. 18, 1985

[51] Int. Cl.[4] .......................... H02G 15/04; F16B 4/00
[52] U.S. Cl. ........................................ 24/545; 24/563; 156/85; 174/DIG. 8; 403/273
[58] Field of Search ............ 24/545, 563, 67.9, 67.11, 24/340; 174/DIG. 8; 264/230; 403/273; 156/85; 312/140, 140.4

[56] References Cited

U.S. PATENT DOCUMENTS

| 451,925 | 5/1891 | Fritz | 24/545 |
|---|---|---|---|
| 738,318 | 9/1903 | Grabler | 24/563 |
| 1,033,161 | 7/1912 | Dixon | 312/140 |
| 1,520,739 | 12/1924 | Zetlitz | 24/563 |
| 1,876,464 | 9/1932 | Miller | 24/67.9 |
| 2,730,781 | 1/1956 | Alunas | 24/67.9 |
| 4,246,687 | 1/1981 | Nolf | 403/273 |
| 4,298,415 | 11/1981 | Nolf | 174/DIG. 8 |
| 4,400,579 | 8/1983 | Nolf | 174/DIG. 8 |
| 4,438,294 | 3/1984 | Meltsch et al. | 174/DIG. 8 |
| 4,467,137 | 8/1984 | Paget et al. | 174/DIG. 8 |

FOREIGN PATENT DOCUMENTS

| 0050995 | 6/1982 | European Pat. Off. | |
| 0068780 | 1/1983 | European Pat. Off. | |
| 0079245 | 6/1983 | European Pat. Off. | |
| 3105471 | 9/1982 | Fed. Rep. of Germany . | |
| 3204866 | 8/1983 | Fed. Rep. of Germany . | |
| 2109170 | 5/1983 | United Kingdom | 403/273 |

Primary Examiner—Victor N. Sakran
Attorney, Agent, or Firm—Donald M. Sell; James A. Smith; Terryl K. Qualey

[57] ABSTRACT

A cable branch-off sealing member for use with a heat shrinkable material that is wrapped around two closely spaced parallel cables and pinched together between the cables to one side of the cables to create a loop of heat shrink material between the cables. The cable sealing member has an elongate tongue smoothly tapered at its leading end for insertion into the loop of heat shrinkable sheet material, which tongue has a width greater than the spacing between the cables to bridge between the peripheries of the cables and is bowed centrally of its width along its length to cause the two layers of heat shrink material to bow outward midway between the cables. A narrow tail is connected to the trailing end of the tongue generally midway of the width of the tongue and extends perpendicular to the length of the tongue to extend into the space between the peripheries of the cables to maintain the spacing between the cables and to keep the tongue generally centered between the cables as the heat shrink material is heated and shrunk. The narrow tail has smooth surfaces for contacting the cables to assure that it will not damage the cable sheathes during the heat shrinking process.

8 Claims, 8 Drawing Figures

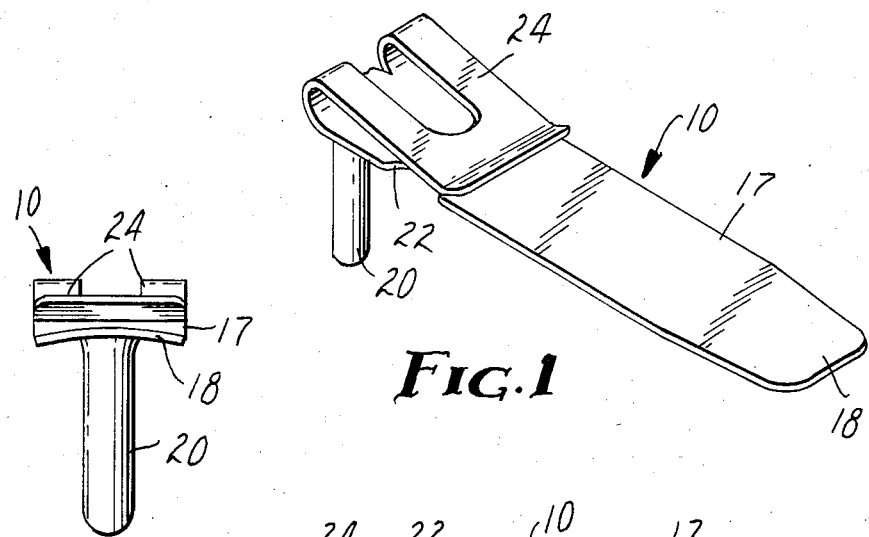
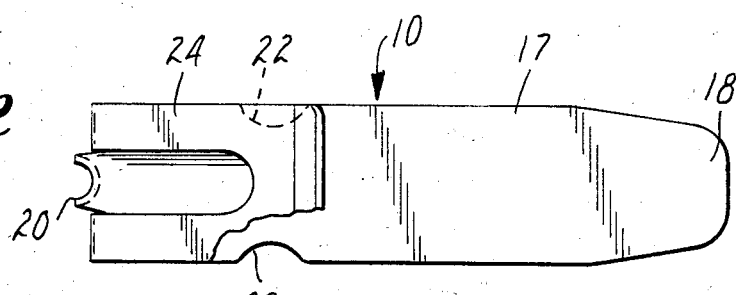
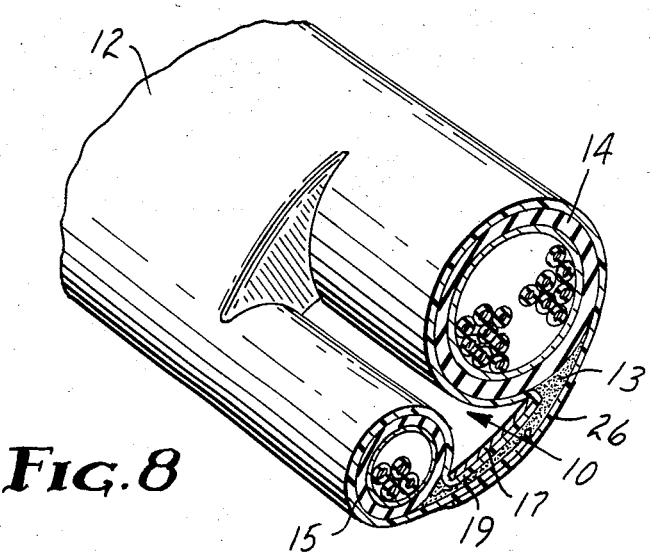

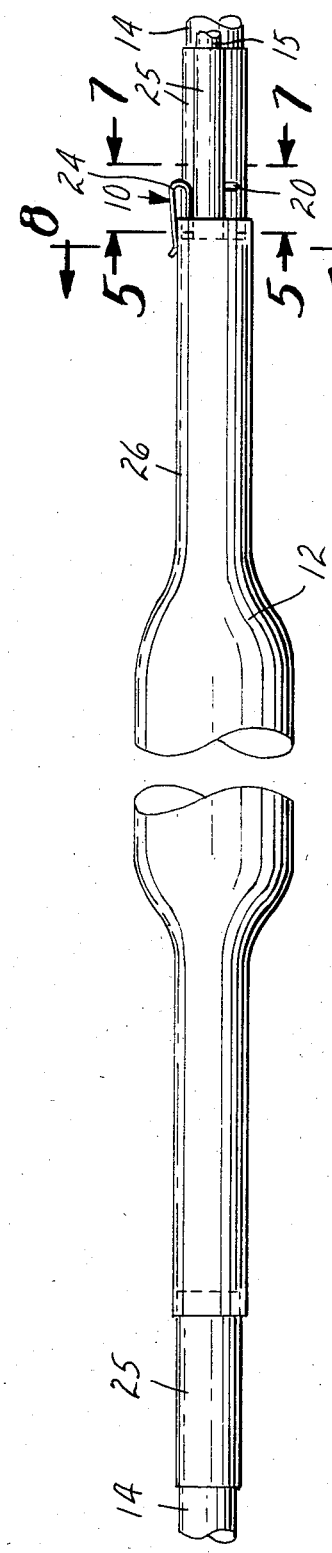
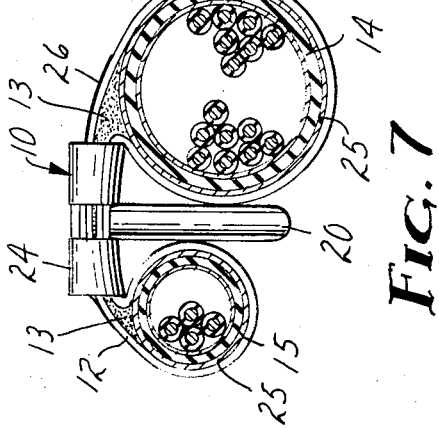
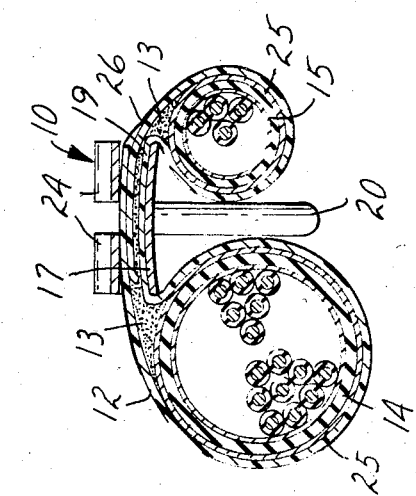
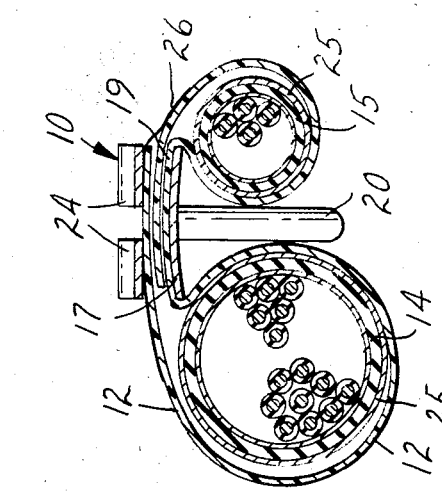

CABLE BRANCH-OFF SEALING MEMBER

FIELD OF THE INVENTION

A cable branch-off sealing member for use with a heat shrinkable material that is wrapped around two closely spaced parallel cables to aid in creating a waterproof seal around and between the cables when the sheet material is heated and shrunk.

BACKGROUND OF THE INVENTION

Heat shrinkable sheet material has found increasing use in sealing around telecommunications cables where the outer sheath has been cut away to expose the inner conductors for splicing to another cable. One commom splice is known as a branch-off splice. In such a splice the conductors of a smaller diameter cable are electrically connected to certain of the conductors of a larger diameter cable to branch off from the larger diameter cable. The branch cable may be used to carry telephone service to a number of houses in a neighborhood while the larger diameter cable may terminate in the splice closure or continue down the street. The heat shrinkable material is wrapped around the cables to fully enclose the splice area, and it has a hot melt adhesive on its inner surface facing the cables. At the end where both the larger diameter cable and the smaller diameter cable exit from the sheet material the heat shrink material must be held together between the cables while the heat shrinkable material is heated and shrunk to seal completely around both cables.

Cable branch-off sealing members for holding the layers of heat shrinkable material together while the sheet material is heated and shrunk to create a waterproof seal around the cables are disclosed in U.S. Pat. Nos. 4,246,687 and 4,298,415; European Patent Application Publication Nos. 50,995; 68,780; and 79,245, and West German Patents No. DE 3105471/A1 and No. DE 3204866/A1. Many of these are unduly complex for manufacture or use.

SUMMARY OF THE INVENTION

The present invention provides a cable branch-off sealing member for use with a heat shrinkable sheet material having a hot melt adhesive on one surface and being wrapped around two closely spaced parallel cables with the adhesive surface facing the cables, one end of the sheet material being pinched together between the cables to one side of the cables, generally along a line tangent to the periphery of the cables, to create a loop of heat shrinkable material between the cables. The cable sealing member is intended to hold the two layers of sheet material together while the sheet material is heated and shrunk to create a waterproof seal around the cables. The sealing member has an elongate tongue smoothly tapered at its leading end for insertion into the loop of sheet material, the tongue having a width greater than the spacing between the cables to bridge between the peripheries of the cables. The tongue is bowed centrally of its width along its length to cause the two layers of heat shrink material to bow outward generally midway between the cables. A narrow tail is connected to the trailing end of the tongue generally midway of its width and extending perpendicular to the length of the tongue to extend into the space between the cables. The tail maintains the spacing between the cables and keeps the tongue generally centered between the cables as the heat shrinkable material is heated and shrunk, and the tail is formed along an axis parallel to its length with smooth surface for contacting the cables to prevent damage to the cable sheaths.

The bowing of the tongue of the sealing member forces the hot melt adhesive to flow into the spaces adjacent the cable sheaths as the heat shrinkable material is heated and shrunk and the elongate nature of the tongue provides a long area for sealing closely around both cables. The narrow tail maintains the spacing between the cable so that the flame of a torch used to shrink the heat shrinkable materials can be gotten between the cables to adequately shrink and seal the heat shrinkable material to the cables beween them. Thus, the branch-off sealing member of the present invention assists in providing an excellent seal around a cable branch-off and at the same time it is very simple to manufacture and use.

THE DRAWING

In the drawing:

FIG. 1 is a perspective view of a branch-off sealing member constructed in accordance with the present invention;

FIG. 2 is an end elevation view of the sealing member looking from its leading end toward its trailing end;

FIG. 3 is a top view of the sealing member;

FIG. 4 is a side elevation view of a cable branch-off with the cable sealing member of the present invention applied to hold the two layers of heat shrinkable material together between the cables;

FIG. 5 is a cross-sectional view taken along line 5—5 of FIG. 4 illustrating the sealing member and heat shrinkable material around the cables prior to heating;

FIG. 6 is a view similar to that of FIG. 5 after the heat shrinkable material has been heated and shrunk;

FIG. 7 is a cross-sectional view taken along line 7—7 of FIG. 4; and

FIG. 8 is a perspective view of the bottom of the cables, sectioned generally along line 8—8 of FIG. 4 after the heat shrinkable material has been heated and shrunk to illustrate the tongue of the branch-off sealing member of the present invention between the cables and the heat shrinkable material at the end of the tongue between the cables.

DESCRIPTION OF THE PREFERRED EMBODIMENT

The cable branch-off sealing member of the present invention is constructed for use with a heat shrinkable sheet material 12 having a hot melt adhesive 13 on one surface and being wrapped around two closely spaced parallel cables 14 and 15 with the adhesive surface facing the cables, one end of the sheet material being pinched together between the cables to one side of the cables, generally along a line tangent to the periphery of the cables as illustrated in FIGS. 5-7. This creates a loop of heat shrinkable material between the cables 14 and 15.

The cable branch-off sealing member 10 comprises an elongate tongue 17 smoothly tapered at its leading end 18 for insertion into the loop 19 of heat shrinkable sheet material 12 and a narrow tail 20 connected to the trailing end of the tongue 17 generally midway of its width and extending perpendicular to the length of the tongue. The tongue 17 has a width greater than the spacing between the cables 14 and 15 to bridge between the peripheries of the cables, and it is bowed centrally of its width along its length, as can be seen in FIG. 2, to cause the two layers of heat shrinkable material to bow outward generally midway between the cables 14 and 15, as illustrated in FIGS. 5-7. In the illustrated embodiment the tongue 17 is formed with a notch 22 along each of its longitudinal edges. When the heat shrinkable material is heated, the heat shrinkable material in the loop 19 shrinks into the notches which assists in preventing the sealing member from being forced out of the area between the cables by the forces generated during shrinking of the heat shrinkable material 12.

The tail 20 is formed to extend into the space between the peripheries of the cables 14 and 15 and to keep the tongue 17 generally centered between the cables as the heat shrinkable material is heated and shrunk. The tail is formed along an axis parallel to its length with smooth surfaces for contacting the cables 14 and 15 so that it does not damage the cable sheaths during heating of the heat shrinkable material 12. In the illustrated embodiment, the tail 20 is rolled through an arc of about 180° to provide smooth surfaces for contacting the cables.

A clip 24 is connected to the trailing end of the tongue 17 and is folded back over the tongue to clip the two layers of heat shrinkable sheet material between the tongue and the folded back portion of the clip. A small portion of the free end of the clip 24 is bent away from the tongue to provide an entrance area into the clip to make it easy to slide onto the sheet material.

The preferred embodiment is stamped and formed from a sheet of aluminum making its manufacture very simple and inexpensive. It has been found that the illustrated construction having a tongue 17 with a length of about 3.5 inches (8.9 cm.) provides excellent sealing around cables with diameters in the range of from 0.5 inch (1.3 cm.) to 1.5 inch (3.8 cm).

FIG. 4 illustrates a heat shrinkable material 12 that has been shrunk and sealed around a branch-off cable splice, with a single large cable 14 entering the splice area where it is spliced to a smaller cable 15 and both cables exiting from the splice area on the right hand side of the drawing. To create the branch splice closure of FIG. 4, aluminum foil tape 25 is first wrapped around the cable sheaths so that the aluminum foil will extend under and beyond the ends of the heat shrinkable material 12 along the cable sheaths to protect the cable sheaths from the heat during the heat shrinking. The heat shrinkable material 12 in its expanded state is then wrapped around the splice area to fully enclose the splice, and the longitudinal edges of the sheet material are affixed together (for example by a pressure sensitive adhesive strip 26). The heat shrinkable material 12 is pinched together between the cables to one side of the cables, generally along a line tangent to the periphery of the cables at the end from which both cables 14 and 15 exit the splice, to create a loop 19 of heat shrinkable material. The cable branch-off sealing member 10 is then slid between the cables to insert the leading end 18 of the tongue 17 into the loop 19 of heat shrinkable material 12 between the cables. The sealing member is moved towards the splice area until the slip 24 fully engages the exterior surface of the sheet material and clips the two layers between the clip 24 and the tongue 17. As the heat shrinkable sheet material 12 is heated, the hot melt adhesive 13 in the area the tongue 17 is caused by the bow in the tongue to flow toward the cables to fill the small gap areas between the layers of heat shrinkable material adjacent the cable sheathes.

The tail 20 maintains the spacing between the cables 14 and 15 to permit good heat shrinking of the material and to maintain the tongue 17 centered between the cables to assure the desired adhesive flow and sealing along its length. When the heat shrinkable material has been fully shrunk the heat shrinkable material at the free end of the tongue 17 transitions from being pinched between the cables to fully encircling the closure as illustrated in FIG. 8.

I claim:

1. A cable branch-off sealing member for use with a heat shrinkable sheet material having a hot melt adhesive on one surface and being wrapped around two closely spaced parallel cables with the adhesive surface facing the cables, one end of the sheet material being pinched together between the cables to one side of the cables, generally along a line tangent to the periphery of the cables, to create a loop of heat shrinkable material between the cables, which cable sealing member holds the two layers of sheet material together while the sheet material is heated and shrunk to create a waterproof seal around the cables, comprising:

an elongate tongue smoothly tapered at its leading end for insertion into the loop of heat shrinkable sheet material, said tongue having a width greater than the spacing between the cables to bridge between the peripheries of the cables and being bowed centrally of its width along its length to cause the two layers of heat shrink material to bow outward generally midway between the cables, and a narrow tail connected to the trailing end of said tongue generally midway of its width and extending perpendicular to the length of said tongue to extend into the space between the cables to maintain the spacing between the cables and to keep said tongue generally between the cables as the heat shrinkable material is heated and shrunk, said tail being formed along an axis parallel to its length with smooth surfaces for contacting the cables.

2. The cable branch-off sealing member of claim 1 wherein said tongue is notched along both longitudinal edges to aid in retaining said tongue in the loop of heat shrinkable material when the material is heated.

3. The cable branch-off sealing member of claim 1 wherein a clip is connected to the trailing end of said tongue and is folded back over said tongue to clip the two layers of heat shrinkable sheet material between said tongue and said folded back portion of said clip.

4. The cable branch-off sealing member of claim 3 wherein said cable branch-off sealing member is stamped and formed from a single sheet of metal.

5. A method of making a cable branch-off seal comprising:

wrapping a heat shrinkable sheet material having a hot melt adhesive on one surface around two closely spaced parallel cables with the adhesive surface facing the cables, pinching the heat shrinkable sheet material together between the cables to one side of the cables, generally along a line tangent to the periphery of the cables, to create a loop of heat shrinkable material between the cables, providing a branch-off sealing member comprising:

an elongate tongue smoothly tapered at its leading end for insertion into the loop of heat shrinkable sheet material, said tongue having a width greater than the spacing between the cables to bridge between the peripheries of the cables and being bowed centrally of its width along its length to cause the two layers of heat shrink material to bow outward generally midway between the cables, and a narrow tail connected to the trailing end of said tongue generally midway of its width and extending perpendicular to the length of said tongue to extend into the space between the cables to maintain the spacing between the cables and to keep said tongue generally centered between the cables as the heat shrinkable material is heated and shrunk, said tail being formed along an axis parallel to its length with smooth surfaces for contacting the cables, positioning the branch-off sealing member with its tongue inserted into the loop of heat shrinkable material and its narrow tail extending into the space between said cables, and heating the heat shrinkable sheet material to shrink it to create a waterproof seal around the cables.

6. The cable branch-off sealing method of claim 5 wherein said tongue of said branch-off sealing member is notched along both longitudinal edges to aid in retaining said tongue in the loop of heat shrinkable material when the material is heated.

7. The cable branch-off sealing method of claim 5 wherein a clip is connected to the trailing end of said tongue of said branch-off sealing member and is folded back over said tongue and said step of positioning the branch-off sealing member includes positioning it to clip the two layers of heat shrinkable sheet material between said tongue and said folded back portion of said clip.

8. The cable branch-off sealing method of claim 7 wherein said cable branch-off sealing member is stamped and formed from a single sheet of metal.

* * * * *